Reissued May 9, 1950

Re. 23,227

UNITED STATES PATENT OFFICE 23,227

PROCESSES FOR PREVENTING CORROSION AND CORROSION INHIBITORS

Charles M. Blair, Jr., and William F. Gross, Webster Groves, Mo., assignors to Petrolite Corporation, Ltd., Wilmington, Del., a corporation of Delaware No Drawing. Original No. 2,468,163, dated April 26, 1949, Serial No. 1,656, January 10, 1948. Application for reissue March 3, 1950, Serial No. 147,566

17 Claims. (Cl. 252—8.55)

Matter enclosed in heavy brackets [ ] appears in the original patent but forms no part of this reissue specification; matter printed in italics indicates the additions made by reissue

This invention relates to the inhibition of corrosion of metals, and particularly to a composition for use in preventing corrosion of metals and particularly iron, steel, and ferrous alloys. The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. Our inhibitors may, however, be used in other systems or applications. They appear to possess properties which impart to metals resistance to attack by a variety of corrosive agents, such as brines, weak inorganic acids, organic acids, $CO_2$, $H_2S$, etc.

Compounds which we have found to be effective for the purpose described above belong to the general class of cyclic amidines, and in particular are substituted imidazolines, in which the imidazoline molecule contains at least one aliphatic, or cycloaliphatic hydrocarbon group containing from 8 to 32 carbon atoms. Cyclic imidazolines in which the 2-carbon atom is substituted by a long chain aliphatic hydrocarbon group are particularly easy to prepare and are very effective for the present use. However, it has been found that equally effective compounds, if not somewhat more effective in some instances, result when the aliphatic hydrocarbon group occurs as a substituent of one of the nitrogen atoms, or of a relatively small organic radical attached to one of the nitrogen atoms.

An important class of the reagents herein contemplated as corrosion preventives may be represented by the following general formula:

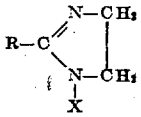

in which either R or X, or both, contain or consist of an aliphatic or cycloaliphatic radical containing from 8 to 32 carbon atoms.

In the most general classification of reagents suitable for our process, the symbol X may include another imidazoline ring, as described more fully below. Shown in the most general way, the compounds contemplated for use herein may be represented by the following formula:

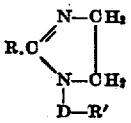

where as least one of the groups R and R′ is an aliphatic or cycloaliphatic hydrocarbon group containing from 8 to 32 carbon atoms and otherwise may be hydrogen or a hydrocarbon radical; and D is a divalent organic radical. In the more common reagents, D will be a relatively small organic radical, such as in the following examples of the grouping D—R′:

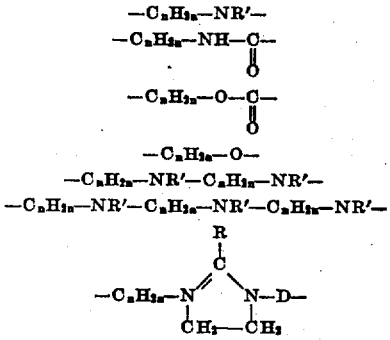

Where n is the numeral 1 to 6 and R′ is hydrogen or an aliphatic or cycloaliphatic hydrocarbon radical.

In the simplest case, the group R′ may be directly attached to the 1-nitrogen atom of the ring, as follows:

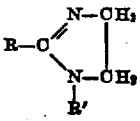

We have found that particularly outstanding corrosion-preventive reagents result when the imidazoline compound contains basic nitrogen groups in addition to those inherently present in the imidazoline ring. In general, compounds of this type which are effective are those in which the basic nitrogen group is contained in the radical D in the above formula.

In this case the products may be represented by the formula:

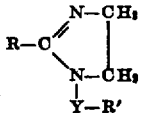

where R and R′ are hydrogen or a hydrocarbon radical, and in which at least one of the groups R and R′ is an aliphatic or cycloaliphatic hydrocarbon group containing from 8 to 32 carbon atoms; and Y is a divalent organic radical containing amino groups. The group R′ may be, and usually is, an amino nitrogen substituent. Examples of organic radicals which Y—R′ may represent are:

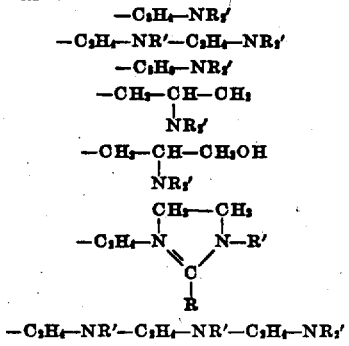

where R′ and R have their previous significance.

Of this class of reagents in which an amino group occurs as a portion of the 1-nitrogen substituent, those which are derived, at least theoretically, from the polyethylene polyamines appear to be particularly effective as corrosion inhibitors and are so outstanding as to constitute an invention within an invention. These have the general formula:

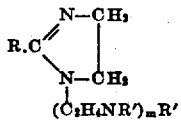

where R and R′ have their previous meanings, and m is a small number, usually less than 6.

The preparation of an imidazoline substituted in the 2-position by aliphatic hydrocarbon radicals is well described in the literature and is readily carried out by reaction between a monocarboxylic acid and a diamine, or polyamine, containing at least one primary amino group, and at least one secondary amino group, or another primary amino group separated from the first primary amino group by two carbon atoms. Examples of suitable polyamines which can be employed for this conventional imidazoline synthesis include ethylenediamine, diethylenetriamine, triethylenetetramine, tetraethylenepentamine, 1,2-diaminopropane, N-ethylethylenediamine, N,N-dibutyldiethylenetriamine, 1,2-diaminobutane, hydroxyethylethylenediamine, dipropylenediamine and the like. For details of the preparation of these reagents see the following U. S. patents: U. S. No. 1,999,989, dated Apr. 30, 1935, Max Bockmuhl et al.; U. S. No. 2,155,877, dated Apr. 25, 1939, Edmund Waldmann et al.; and U. S. No. 2,155,878, dated Apr. 25, 1939, Edmund Waldmann et al. Also see Chem. Rev., 32, 47 (43).

When an aliphatic or cycloaliphatic carboxylic acid containing 9 or more carbon atoms is employed in the above described synthesis, the resulting imidazoline will contain a 2-substituent consisting of an aliphatic hydrocarbon radical containing 8 or more carbon atoms. Suitable corrosion-preventive reagents may, therefore, be made directly by reaction of acids such as oleic acid, linoleic acid, linolenic acid, erucic acid, talloil fatty acids, naphthenic acids, nonoic acid, and the like, with suitable amines such as those enumerated above. When this condensation is carried out at a temperature of 250° C. or higher, between equal mole proportions of mono-carboxylic acid and polyamine, two moles of water are evolved and the desired imidazoline is formed in almost quantitative yield. Such suitable reagents may be represented by the following formula:

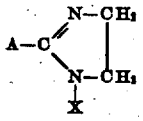

where X may be ethylene amino radicals, hydroxyethylamino radicals, aminoalkyl radicals, alkyleneoxyalkyl radicals, hydrogen hydrocarbon radicals, cycloaliphatic or aliphatic hydrocarbon radicals or another imidazoline group; and where A is an aliphatic or cycloaliphatic hydrocarbon radical having from 8 to 32 carbon atoms. In the above formulas for imidazolines it should be pointed out that where X is a hydrogen atom, the nitrogen atoms become equivalent, insofar as reaction is concerned, and cannot be distinguished from one another. This is supposed, on theoretical grounds, to result from the mobility of the hydrogen proton, and its ease of transfer from one nitrogen atom to the other. However, where X is an organic substituent other than hydrogen, the nitrogen atoms are no longer equivalent. For the purpose of the present application, the nitrogen atom to which the radical X is attached will be called the 1-nitrogen atom of the imidazoline ring. This is in conformance with the usual chemical convention in numbering heterocyclic ring positions.

As mentioned above, we have discovered that equally suitable corrosion-preventive reagents may be obtained by introducing into the imidazoline compound an aliphatic hydrocargon group of proper size as a portion of the substituent attached to the 1-nitrogen atom of the imidazoline ring. Where the aliphatic hydrocarbon group occurs in this position, it is unnecessary that the 2-carbon atom substituent contains 8 or more carbon atoms. It may be, in fact, only a hydrogen atom or a methyl group, ethyl group, phenyl group, or other relatively small hydrocarbon group, although it is not restricted to such small groups. The preparation of imidazoline compounds in which the higher molecular weight hydrocarbon radical occurs as a portion of the nitrogen atom substituent, are also readily prepared by methods analogous to those already described. In this case, however, a number of alternative procedures are possible. For example, one may prepare 2-methyl, 1-(octadecylaminoethyl-) imidazoline by reaction of octadecyl aminoethylethylenediamine with acetic acid at a temperature of 250° to 300° C. until two moles of water are evolved for every mole of acetic acid employed. The same reagent may result by the preparation of 2-methyl, 1-aminoethyl imidazoline followed by alkylation with octadecyl bromide and separation of resulting alkylation products to isolate the desired product. For the preparation of 1,2-substituted imidazolines, see King & McMillan, J. A. C. S. 68, 1774 (1946); Kyrides et al., J. Organic Chem. 12, 577 (1947).

Examples of suitable substituted imidazolines in which the aliphatic or cycloaliphatic group containing from 8 to 32 carbon atoms is a 2-position substituent, are as follows:

(1)

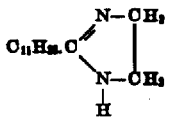

2-undecylimidazoline (2)

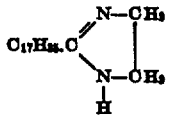

2-heptadecylimidazoline (3)

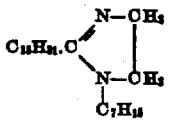

2-pentadecyl, 1-heptylimidazoline (4)

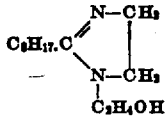

2-octyl, 1-hydroxyethylimidazoline (5)

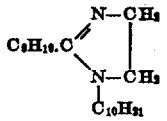

2-nonyl, 1-decylimidazoline (6)

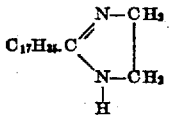

2-oleylimidazoline (7)

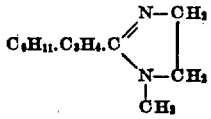

2-cyclohexylethyl, 1-methylimidazoline (8)

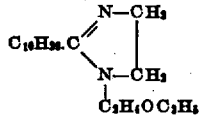

2-abietyl, 1-ethyloxyethylimidazoline

Suitable substituted imidazolines in which the aliphatic or cycloaliphatic group containing from 8 to 32 carbon atoms is the 1-position substituent or is a part of this substituent, are exemplified by the following:

(1)

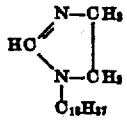

1-octadecylimidazoline (2)

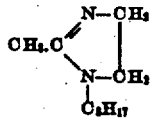

2-methyl, 1-octylimidazoline (3)

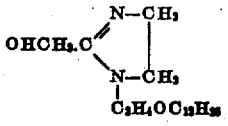

1-dodecyloxymethyl, 2-hydroxymethylimidazoline (4)

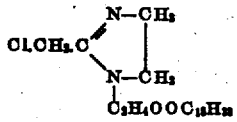

1-oleoloxyethyl, 2-chloromethylimidazoline (5)

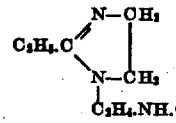

1-N-decylaminoethyl, 2-ethylimidazoline (6)

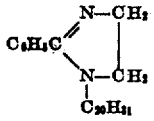

1-abietyl, 2-phenylimidazoline

We have pointed out above that imidazolines containing basic nitrogen groups, in addition to those occurring in the imidazoline ring are particularly effective corrosion inhibitors. Such products are readily prepared from the commercially available polyethylene polyamines, or from polyamines in which there are three or more amino groups and in which there is at least one primary amino group separated by two carbon atoms from a secondary or primary amino group. Examples of suitable preferred compounds of this type are the following:

(1)

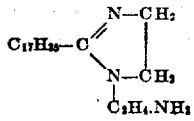

2-heptadecyl, 1-aminoethylimidazoline (2)

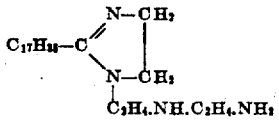

2-heptadecyl, 1-diethylenediaminoimidazoline (3)

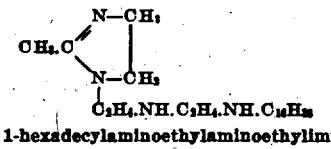

2-methyl, 1-hexadecylaminoethylaminoethylimidazoline (4)

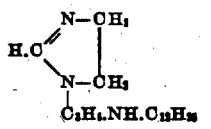

1-dodecylaminopropylimidazoline (5)

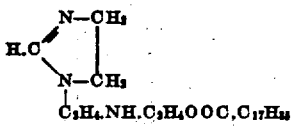

1-stearoyloxyethylaminoethylimidazoline (6)

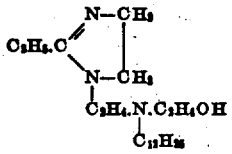

2-ethyl, 1-(N,N dodecyl, hydroxyethyl)aminoethylimidazoline (7)

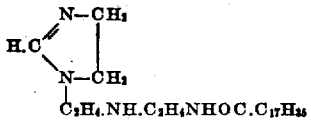

1-stearamidoethylaminoethylimidazoline (8)

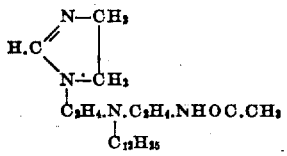

1-(N-dodecyl)-acetamidoethylaminoethylimidazoline (9)

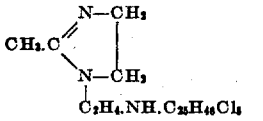

Chloroparaffin alkylation product of 1-aminoethyl, 2-methylimidazoline

Although we have shown above the composition of a number of effective inhibitors which are imidazolines containing at least one aliphatic or cycloaliphatic hydrocarbon radical having from 8 to 32 carbon atoms, we should like to point out that, in general, the most effective reagents and those having the most desirable solubility characteristics are those in which the aliphatic or cycloaliphatic group contains from 10 to 20 carbon atoms. Examples of such preferred groups are decyl, oleyl, abietyl, stearyl, and the like.

The corrosion preventive products of the present invention, since they contain an imidazoline ring, may, in general, be alkylated to form either a 1-alkyl-substituted imidazoline, or a quaternary ammonium salt, where the alkyl group is attached to either or both the 1 and 3 nitrogen atoms. For example, using cetyl bromide as a typical alkylating agent, the following reactions may be carried out:

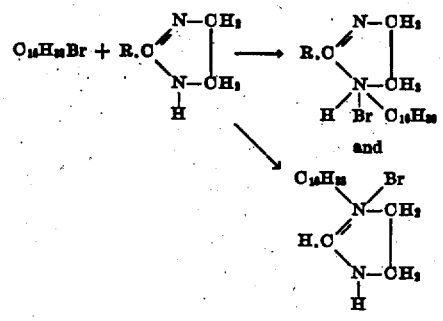

(14)

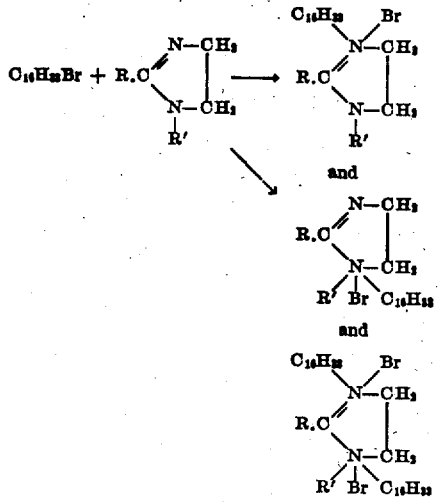

Instead of the cetyl bromide used in the examples above, one may use other alkylating agents such as methyl bromide, benzyl chloride, ethyl sulfate, dichloroethyl ether, chloroparaffin, etc., to obtain equally suitable derivatives of imidazolines which may be employed in the present process.

For details of preparation of various imidazolinium salts, such as those mentioned above, see, for example, Shepard and Shonle, J. A. C. S. 69, 2269 (1947).

Although we have described the corrosion inhibitors of our process as imidazolines, we may, in many instances, employ these compounds in the form of their salts, either with organic or inorganic acids. Being relatively strong bases, the imidazolines readily form such salts, and where the reagent contains basic groups in addition to the imidazoline ring nitrogen atoms, they may form di- or polysalts. Examples of acids which may be used to form such salts are hydrochloric acid, sulfuric acid, acetic acid, oxalic acid, maleic acid, oleic acid, abietic acid, phosphoric acid, petroleum sulphonic acid, naphthenic acid, rosin, phenylacetic acid, benzoic acid, and the like.

Salts of the imidazolines, such as those above described, appear to be equally as effective as the free bases. Probably, in the dilute solutions in which they are employed as corrosion inhibitors, the salts hydrolyze or otherwise decompose to some extent and reach an equilibrium with the acids and other constituents of the corrosion medium.

While we have described our corrosion inhibitors as imidazolines and have illustrated them above as single ring compounds, it should be pointed out that in some instances reagent compounds containing two or more heterocyclic rings, such as two imidazoline rings may be employed. For example, if one reacts one mole of triethylene tetramine with a mole of stearic acid to form a substituted heptadecylimidazoline, and then reacts this further with another mole of a carboxylic acid at a suitable high temperature, a diimidazoline is obtained.

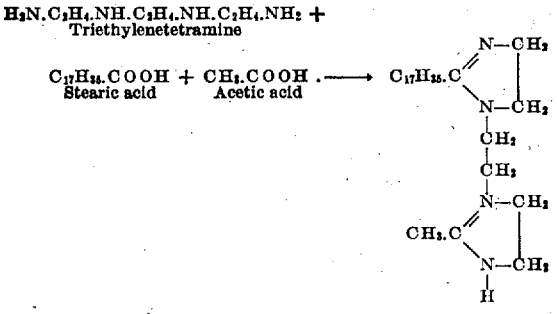

Similarly,

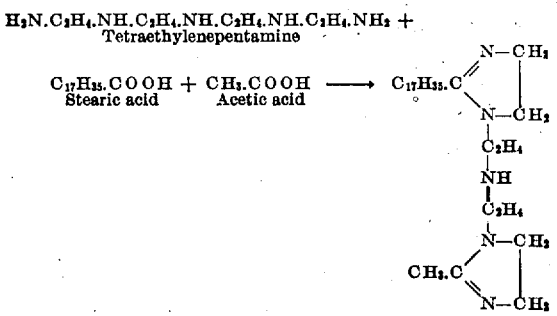

Such diimidazolines are intended to be included when reference is made to substituted imidazolines herein or in the claims.

Many obvious simple derivatives of the herein described corrosion inhibitors may be prepared which are also effective. For example, we have defined the groups R and R′ in the structural formulae above as being members of the class consisting of hydrogen, aliphatic, and cycloaliphatic hydrocarbon groups. Actually, the use of halogenated hydrocarbon groups appears to yield equally effective reagents, and chlorohydrocarbon groups, particularly, are readily introduced during synthesis. Since the chlorine atoms in these groups are relatively non-reactive and yield products with solubilities similar to the hydrocarbon derivative, they do not differ greatly in behavior from the corresponding hydrocarbon derivative.

Imidazolines containing a relatively high molecular weight hydrocarbon radical, and substituted in the 4- and/or 5-ring positions are also effective inhibitors, but are not so readily prepared from presently available commercial reagents.

The method of carrying out our process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e. g., once every day or two) into the annulus by means of a so-called "boll weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. The results, for example, when the tubing is surrounding at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The amount of corrosion preventive agent required in our process varies with the corrosiveness of the system, but where a continuous or semi-continuous treating procedure is carried out as described above, the addition of reagent in the proportion of from one part per 1,000 to one part per 20,000 or more parts of corrosive fluid will generally provide protection. As an example of treating procedure and results, the following actual well treatment history is presented.

Treatment was made of a West Texas oil well producing 15 bbls. of oil and 1 bbl. of brine per day. The brine contained 2.75% chlorides as NaCl, and 275 parts per million of hydrogen sulfide. A solution of 2-heptadecylimidazoline in aromatic naphtha was pumped continuously down the annulus of the well at such a rate that one part of imidazoline was introduced per 8,000 parts of oil produced. While thus treating the well, weighed steel test plates were kept exposed to the well fluids in the tubing and were periodically (every two weeks) removed, cleaned and reweighed to determine the corrosion rate. The initial corrosion rate in this well before treatment began was 0.016 inch per year. While treated as described above, the corrosion rate was found to be 0.0005 inch per year. The rate of imidazoline injection was then reduced to one part per 20,000 parts of oil, and the corrosion rate was found to be 0.0009 inch per year. The ratio of inhibitor was then increased to one part in 40,000 parts of oil and the corrosion rate rose to 0.003 inch per year. Finally, chemical injection was stopped. It was found that after 30 days the corrosion rate had risen to 0.013 inch per year and after 60 days was again at its original rate, as determined before treatment.

A similar test to the above was run in a companion well to that used in the previous test. This well produced 12 bbls. of oil and 2 bbls. of brine per day. The brine had the same composition as that given above. The well was treated by pouring down the casing once a day a solution of 1-dodecyl,2-methylimidazoline oleate in naphtha. The amount of solution used was such as to provide an average concentration of one part of 1-dodecyl,2-methylimidazoline per 6,000 parts of oil produced. The corrosion rate of steel coupons exposed in the well head was reduced from a blank value of 0.015 inch per year to 0.0015 inch per year.

The protective action of the herein described reagents appears to be maintained for an appreciable time after treatment ceases, but eventually is lost unless another application is made.

For the protection of gas wells and gas-condensate wells, the amount of corrosion inhibitor required will usually be within range of one-half to 3 lbs. per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less imidazoline than usually would be required for neutralization of the acids produced.

Recapitulating, we have found that the corrosion of metals, and particularly ferrous metals, may be inhibited by the application thereto of a substituted imidazoline in which a substituent at either or both the 1- or 2-position of the ring contains an aliphatic or cycloaliphatic hydrocarbon group having from 8 to 32 carbon atoms. Of this broad genus of corrosion inhibitors, there are several sub-classes which may be employed effectively in our process. Such sub-classes are, (1) those in which the 1-position substituent contains amino group, (2) those in which the 1-position substituent is free or amino groups, (3) those in which the 4- and/or 5-position ring carbons are substituted, etc. The process of inhibiting corrosion employing the first of these sub-classes forms the subject-matter of our co-pending application for patent, Serial No. 1,657, filed January 10, 1948, *now Patent No. 2,446,517, dated Apr. 5, 1949.*

Having thus described our invention, what we claim as new and desire to secure by Letters Patent is:

1. A process for preventing corrosion of metals, comprising the step of applying to such metals a substituted imidazoline selected from the class consisting of:

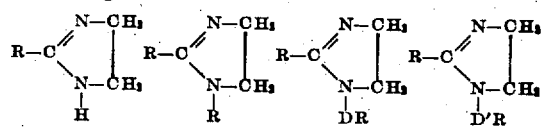

in which D represents a divalent, non-amino, organic radical containing less than 25 carbon atoms, composed of elements from the group consisting of C, H, O, and N; D′ represents a divalent, organic radical containing less than 25 carbon atoms, composed of elements from the group consisting of C, H, O, and N, and containing at least one amino group; and R is a member of the class consisting of hydrogen and aliphatic and cycloaliphatic hydrocarbon radicals; with the proviso that at least one occurrence of R contains 8 to 32 carbon atoms.

2. A process for preventing corrosion of ferrous metals, comprising the step of applying to such metals a substituted imidazoline selected from the class consisting of:

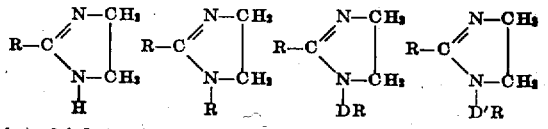

in which D represents a divalent, non-amino, organic radical containing less than 25 carbon atoms, composed of elements from the group consisting of C, H, O, and N; D′ represents a divalent, organic radical containing less than 25 carbon atoms, composed of elements from the group consisting of C, H, O, and N, and containing at least one amino group; and R is a member of the class consisting of hydrogen and aliphatic and cycloaliphatic hydrocarbon radicals; with the proviso that at least one occurrence of R contains 8 to 32 carbon atoms.

3. A process for preventing corrosion of ferrous metals, comprising the step of applying to such metals a substituted imidazoline selected from the class consisting of:

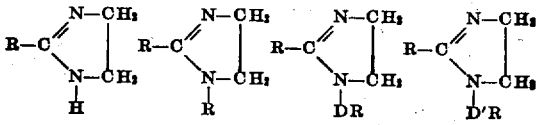

in which D represents a divalent, non-amino, organic radical containing less than 25 carbon atoms, composed of elements from the group consisting of C, H, O, and N; D′ represents a divalent, organic radical containing less than 25 carbon atoms, composed of elements from the group consisting of C, H, O, and N, and containing at least one amino group; and R is a member of the class consisting of hydrogen and aliphatic and cycloaliphatic hydrocarbon radicals; with the proviso that at least one occurrence of R contains 10 to 20 carbon atoms.

4. A process for preventing corrosion of ferrous metals, comprising the step of applying to such metals a substituted imidazoline of the following formula:

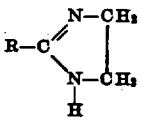

in which R is a member of the class consisting of aliphatic and cycloaliphatic hydrocarbon radicals containing 10 to 20 carbon atoms.

5. A process for preventing corrosion of ferrous metals, comprising the step of applying to such metals a substituted imidazoline of the following formula:

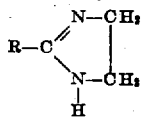

in which R is an aliphatic hydrocarbon radical containing from 10 to 20 carbon atoms.

6. A process for preventing corrosion of ferrous metals, comprising the step of applying to such metals 2-heptadecenylimidazoline.

7. A process for preventing corrosion of ferrous metals, comprising the step of applying to such metals a substituted imidazoline of the following formula:

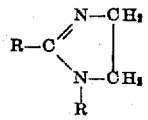

where R is a member of the class consisting of hydrogen and aliphatic and cycloaliphatic hydrocarbon radicals; with the proviso that at least one occurrence of R contains 10 to 20 carbon atoms.

8. A process for preventing corrosion of ferrous metals, comprising the step of applying to such metals a substituted imidazoline of the following formula:

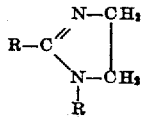

in which R is a member of the class consisting of hydrogen and aliphatic and cycloaliphatic hydrocarbon radicals; with the proviso that at least one occurrence of R is an aliphatic radical containing from 10 to 20 carbon atoms.

9. A process for preventing corrosion of ferrous metals, comprising the step of applying to such metals 1-undecyl, 2-methyl imidazoline.

10. A process for preventing corrosion of ferrous metals, comprising the steps of applying to such metals a substituted imidazoline of the formula:

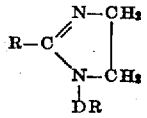

in which D represents a divalent, non-amino, organic radical containing less than 25 carbon atoms, composed of elements from the group consisting of C, H, O, and N; and R is a member of the class consisting of hydrogen and aliphatic and cycloaliphatic hydrocarbon radicals; with the proviso that at least one occurrence of R contains 10 to 20 carbon atoms.

11. A process for preventing corrosion of ferrous metals, comprising the step of applying to such metals a substituted imidazoline of the formula:

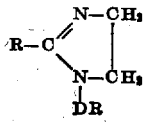

in which D represents a divalent, non-amino, organic radical containing less than 25 carbon atoms, composed of elements from the group consisting of C, H, O, and N; and R is an aliphatic hydrocarbon radical having from 10 to 20 carbon atoms.

12. A process for preventing corrosion of oil and gas well equipment, comprising the step of injecting into the well as substituted imidazoline selected from the class of:

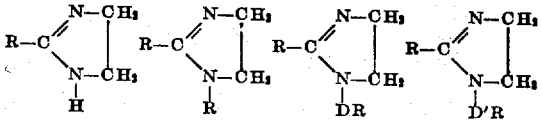

in which D represents a divalent, non-amino, organic radical containing less than 25 carbon atoms, composed of elements from the group consisting of C, H, O, and N; D′ represents a divalent, organic radical containing less than 25 carbon atoms, composed of elements from the group consisting of C, H, O, and N, and containing at least one amino group; and R is a member of the class consisting of hydrogen and aliphatic and cycloaliphatic hydrocarbon radicals; with the proviso that at least one occurrence of R contains 8 to 32 carbon atoms.

13. A process for preventing corrosion of oil and gas well equipment, comprising the step of injecting into the well a substituted imidazoline of the following formula:

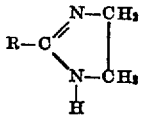

in which R is a member of the class consisting of aliphatic and cycloaliphatic hydrocarbon radicals containing 10 to 20 carbon atoms.

14. A process for preventing corrosion of oil and gas well equipment, comprising the step of injecting into the well as substituted imidazoline of the following formula:

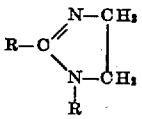

where R is a member of the class consisting of hydrogen and aliphatic and cycloaliphatic hydrocarbon radicals; with the proviso that at least one occurrence of R contains 10 to 20 carbon atoms.

15. A process for preventing corrosion of oil and gas well equipment, comprising the step of injecting into the well as substituted imidazoline of the formula:

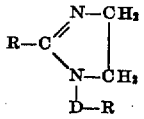

in which D represents a divalent, non-amino, organic radical containing less than 25 carbon atoms, composed of elements from the group consisting of C, H, O, and N; and R is a member of the class consisting of hydrogen and aliphatic and cycloaliphatic hydrocarbon radicals; with the proviso that at least one occurrence of R contains 10 to 20 carbon atoms.

16. A process for preventing corrosion of oil and gas well equipment, comprising the step of injecting into the well a carboxylic acid salt of a substituted imidazoline selected from the class of:

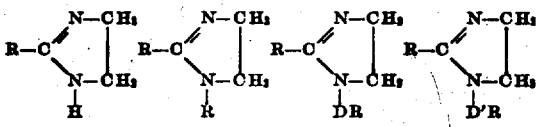

in which D represents a divalent, non-amino, organic radical containing less than 25 carbon atoms, composed of elements from the group consisting of C, H, O, and N; D' represents a divalent, organic radical containing less than 25 carbon atoms, composed of elements from the group consisting of C, H, O, and N, and containing at least one amino group; and R is a member of the class consisting of hydrogen and aliphatic and cycloaliphatic hydrocarbon radicals; with the proviso that at least one occurrence of R contains 8 to 32 carbon atoms.

*17. A process for preventing corrosion of metals, comprising the step of applying to such metals a substituted imidazoline selected from the class consisting of:*

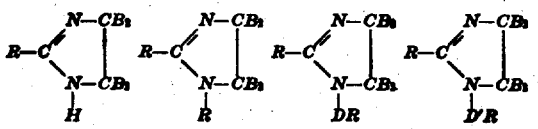

*in which D represents a divalent, non-amino, organic radical containing less than 25 carbon atoms, composed of elements from the group con-*

*sisting of C, H, O, and N; D' represents a divalent, organic radical containing less than 25 carbon atoms, composed of elements from the group consisting of C, H, O, and N, and containing at least one amino group; R is a member of the class consisting of hydrogen and aliphatic and cycloaliphatic hydrocarbon radicals; with the proviso that at least one occurrence of R contains 8 to 32 carbon atoms; and B is a member of the class consisting of hydrogen and alkyl radicals having not over two carbon atoms, with the proviso that at least three occurrences of B be hydrogen.*

CHARLES M. BLAIR, JR.
WILLIAM F. GROSS.

REFERENCES CITED

The following references are of record in the file of this patent or the original patent:

UNITED STATES PATENTS

| Number | Name | Date |
|---|---|---|
| 1,829,705 | Walker | Oct. 27, 1931 |
| 1,873,084 | Walker | Aug. 23, 1932 |
| 2,357,559 | Smith | Sept. 5, 1944 |

OTHER REFERENCES

Formaldehyde vs. Sulfide Corrosion, article in Indus. and Engineering Chem., Indus. ed., Special Dep'ts., vol 38, pp. 10 and 14, Jan. 16, 1946.

Condensate Field Corrosion, article in The Oil Weekly, May 6, 1938, p. 32.